United States Patent [19]

Lewis et al.

[11] Patent Number: 4,696,707
[45] Date of Patent: Sep. 29, 1987

[54] COMPOSITE TAPE PLACEMENT APPARATUS WITH NATURAL PATH GENERATION MEANS

[75] Inventors: Henry W. Lewis; Jorge E. Romero, both of Rockford, Ill.

[73] Assignee: The Ingersoll Milling Machine Company, Rockford, Ill.

[21] Appl. No.: 794,172

[22] Filed: Oct. 31, 1985

[51] Int. Cl.⁴ .............................................. B31D 1/00
[52] U.S. Cl. ................................... 156/64; 116/350; 116/361; 116/574; 364/168; 364/169; 364/476
[58] Field of Search ............................ 364/167–169, 364/474, 476, 191; 318/569–570; 156/361, 574, 577, 350

[56] References Cited

U.S. PATENT DOCUMENTS

| Re. 30,016 | 5/1979 | Hohn ................................. 364/474 |
| 3,560,308 | 2/1971 | Buck .................................. 156/522 |
| 3,574,040 | 4/1971 | Chitwood et al. ............... 156/350 X |
| 3,577,297 | 5/1971 | Howard ............................. 156/522 |
| 3,577,303 | 5/1971 | Buck .................................. 156/522 |
| 3,607,572 | 9/1971 | Jorgensen . |
| 3,625,799 | 12/1971 | Way . |
| 3,752,728 | 8/1973 | Smirnov et al. . |
| 3,775,060 | 11/1973 | Courtois et al. . |
| 3,775,219 | 11/1973 | Karlson et al. ..................... 156/363 |
| 3,810,805 | 5/1974 | Goldsworthy et al. ........... 156/361 |
| 3,939,034 | 2/1976 | Tanaka et al. ...................... 156/522 |
| 3,970,831 | 7/1976 | Hegyi ............................... 156/363 X |
| 3,992,244 | 11/1976 | Craig et al. . |
| 3,997,387 | 12/1976 | Yamaguchi et al. . |
| 4,011,437 | 3/1977 | Hohn . |
| 4,133,711 | 1/1979 | August et al. ...................... 156/353 |
| 4,180,181 | 12/1979 | Brandwein . |
| 4,182,645 | 1/1980 | Hill . |
| 4,208,238 | 6/1980 | August et al. ...................... 156/523 |
| 4,259,144 | 3/1981 | Ballentine ......................... 156/523 |
| 4,285,752 | 8/1981 | Higgins .......................... 156/522 X |
| 4,292,108 | 9/1981 | Weiss et al. ....................... 156/361 |
| 4,328,062 | 5/1982 | Off et al. ...................... 156/361 X |
| 4,330,357 | 5/1982 | Collins . |
| 4,351,688 | 9/1982 | Weiss et al. ....................... 156/523 |
| 4,370,721 | 1/1983 | Berenberg et al. ............... 364/474 |
| 4,382,836 | 5/1983 | Frank ............................ 156/522 X |
| 4,419,170 | 12/1983 | Blad ............................... 156/361 X |
| 4,453,221 | 6/1984 | Davis et al. ....................... 364/513 |
| 4,491,906 | 1/1985 | Kishi et al. .................... 364/167 X |
| 4,506,335 | 3/1985 | Magnuson ........................ 364/174 |
| 4,516,461 | 5/1985 | Schaeffer ...................... 83/563 X |
| 4,531,998 | 7/1985 | Peterson ............................ 156/574 |
| 4,557,783 | 12/1985 | Grone et al. ................... 156/523 X |
| 4,557,790 | 12/1985 | Wisbey ............................. 156/511 |
| 4,569,716 | 2/1986 | Pugh ................................. 156/510 |
| 4,591,402 | 5/1986 | Evans et al. .................. 156/574 X |
| 4,598,380 | 7/1986 | Holmes et al. .................... 364/474 |
| 4,601,775 | 7/1986 | Grone ............................... 156/523 |

OTHER PUBLICATIONS

"Natural Path Report", 2-52700/4AVO-167 (covered by letter of Oct. 15, 1984).
"ATLM Post-Processor Requirements" Document, 2-52700/4AVO-196 (covered by letter of Nov. 13, 1984).

Primary Examiner—David Simmons
Attorney, Agent, or Firm—Fitch, Even, Tabin & Flannery

[57] ABSTRACT

A tape placement method and apparatus for producing laminated articles from composite tape. The tape placement apparatus builds plies of a laminated article by laying courses of composite tape along natural or untensioned paths of a compound contoured surface. The natural paths are determined by a path generation routine which incrementally fits an untensioned path to a compound curved surface and outputs the data as a desired path for a tape course. The natural paths are generated as nonmachine specific geometric data which are translated into a machine instructions which cause controlled motions of the tape laying head of the tape placement apparatus. The translation into machine instructions includes an alignment process whereby variations in the orientation of the contoured surface can be corrected. The machine instructions are transmitted as desired positions to a adaptive controller which positions a tape laying head of the placement apparatus based on the difference between the desired positions and the actual positions of the tape head.

44 Claims, 17 Drawing Figures

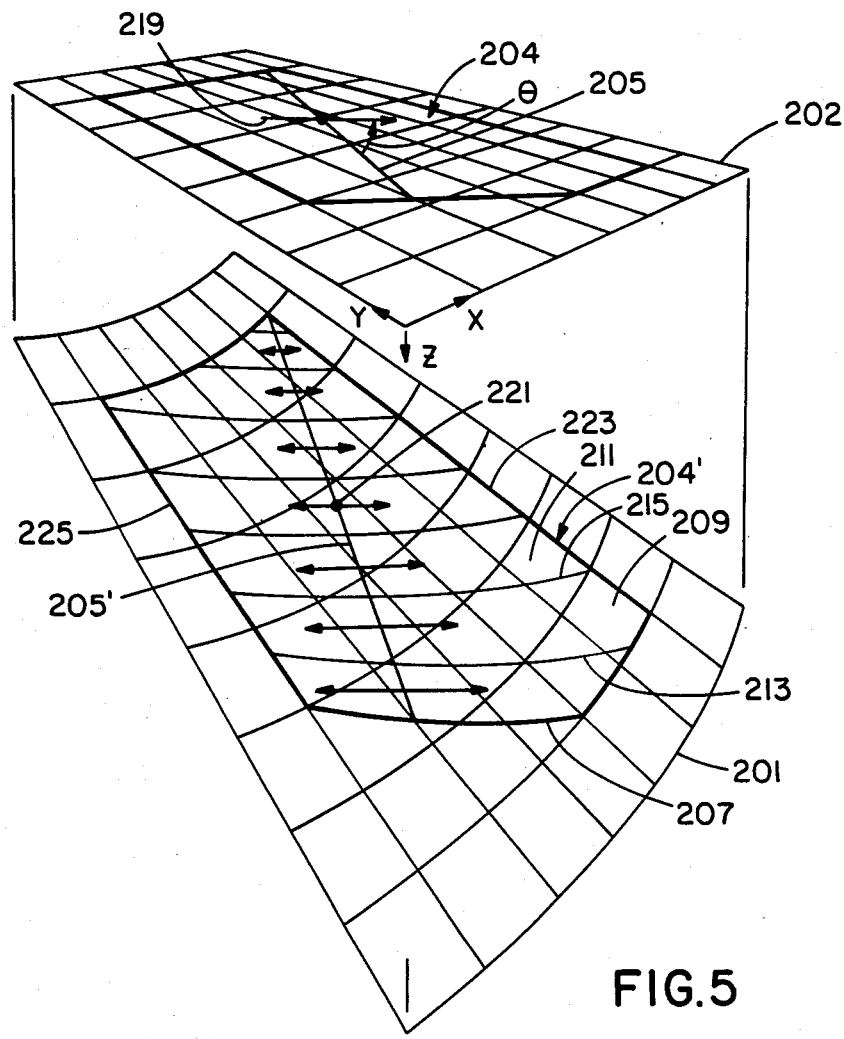
FIG.5
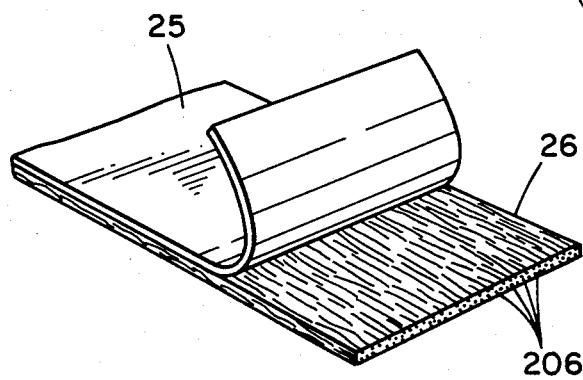
FIG.6
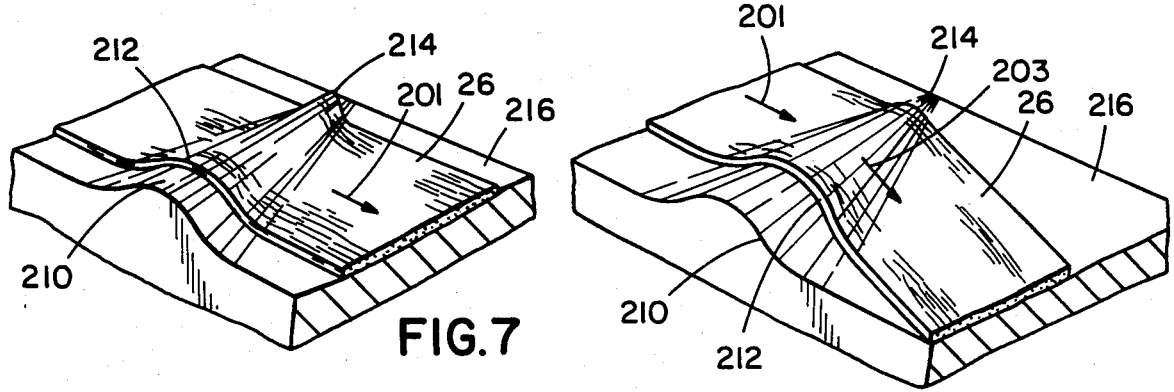
FIG.7
FIG.8

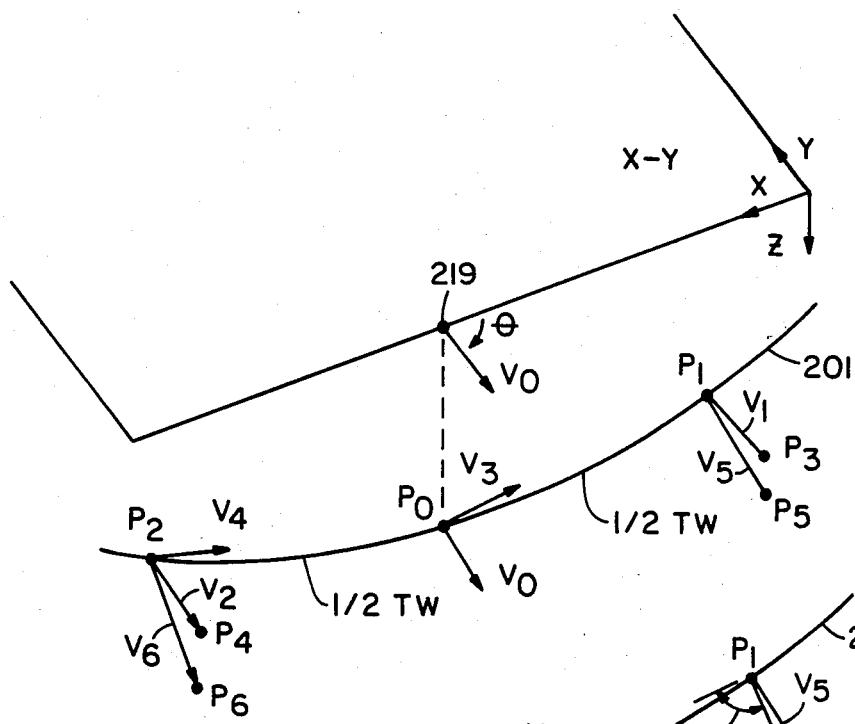
FIG. 9
FIG. 10
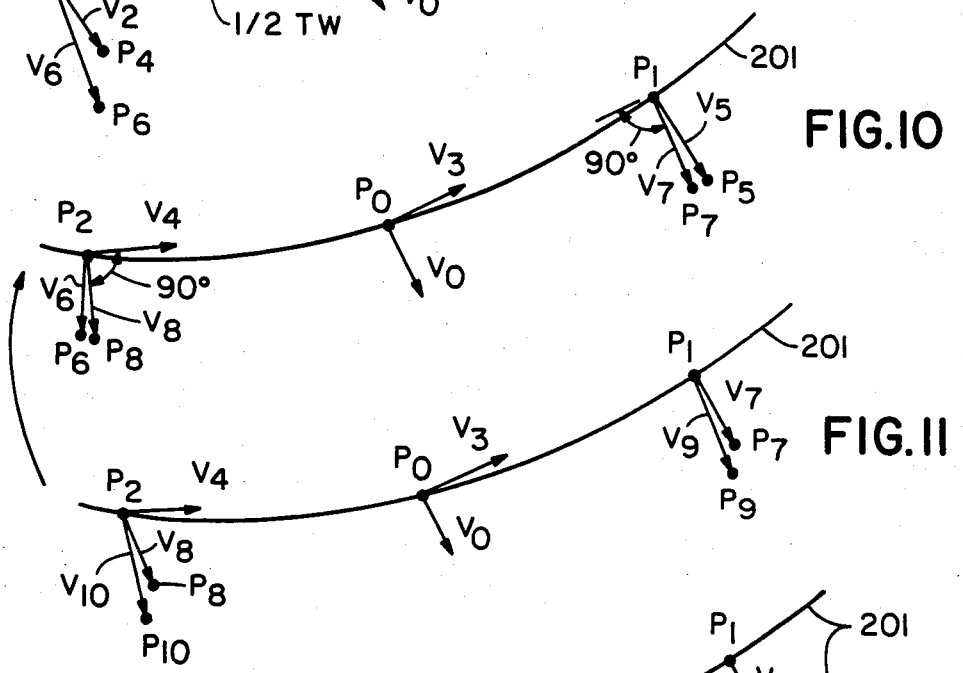
FIG. 11
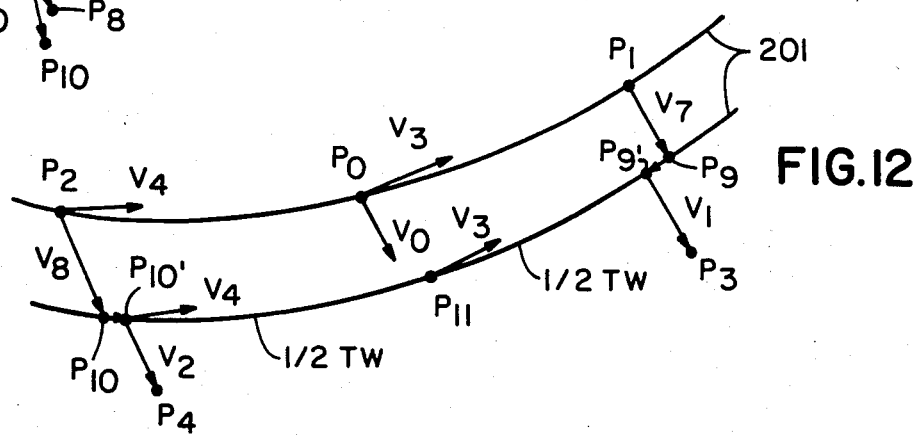
FIG. 12

COMPOSITE TAPE PLACEMENT APPARATUS WITH NATURAL PATH GENERATION MEANS

The invention pertains generally to tape placement apparatus and is more particularly directed to a tape laying machine which builds plies of composite tape with courses laid along their natural path to form a laminated article of a complex contour.

The term "composite" in the present context describes those materials comprising a multiplicity of filaments embedded in a matrix of thermosetting resin. When used to produce articles in the form of sheets or shells, composites have usually taken the form of woven mats of filaments prepregnated with the resin, or resin tapes in which fibers are aligned in the long direction of tape and where the tape is laid in courses chosen to align the fibers in the direction of the principal tensile forces encountered. Articles made in this fashion typically include various component parts of aircraft, and especially the aerodynamic surfaces thereof.

Heretofore, the application of these fabrication techniques to aircraft components having curved surfaces was limited essentially to laying the prepregnated mats or tapes upon a flat surface in a sufficient number of lamina to provide the necessary ultimate strength, and then shaping the essentially flat laminate thus formed by pressing it into a mold which shaped the article. The mold was then placed in an autoclave where the resinous material was rendered initially more plastic by the heat curing process which thereafter ultimately cured and hardened the resin to lock the reinforcing fibers in place.

It may be appreciated that the manufacture of curved shells in this fashion had to be limited to relatively simple curves, particularly in the case of thicker laminates, both as a matter of the limitation of the process and of the danger of disorienting the reinforcing fibers from a desired alignment in the transformation from plane sheet to curved shell.

Therefore, for shells of compound curvature, it is more desirable to lay up the final shape of the laminated structure incrementally, i.e., with tape which is laid directly upon a mold or mandrel which determines the final shape of the article. This permits the composite tape to be laid with its reinforcing fibers in the desired final orientation in the manufactured article, and when the article in uncured form has been built up to the desired thickness, to cure the resin in place in an autoclave without any intermediate transfer and molding steps to conform the laminated structure to the actual shape of a mold.

This desirable objective presents its own difficulties, however, inasmuch as it is a practical necessity to work with composite tapes ranging in width from one inch to six inches, and about 0.075 inches thick with a 40-60 percent filament content of graphite which is essentially unstretchable under the conditions in which the tape is laid to build the composite article. In particular, it is essential that the composite tape be applied to the mold form without the puckering of its edges, and without overlapping adjacent courses of tape within a given stratum of the laminate, and without excessive gaps between adjacent courses of tape.

The puckering or wrinkling of the tape edges is particularly detrimental because it provides an area of local weakness in the sense that the cured matrix material must yield and suffer the shearing action of the kinked fibers as they seek under load to straighten themselves into alignment with the tensile forces. This type of defect will result in a weakness in the laminate as the puckered or wrinkled layer of the structure is unable to carry its share of the designed load.

It is therefore desirable to provide a system for laying composite tape for the described purpose which will lay unwrinkled tape upon a surface of compound contour, and which can satisfy the requirements of accuracy at practical and economic production rates.

SUMMARY OF THE INVENTION

The invention provides a multi-axis tape laying machine having a tape laying head for depositing multiple courses of composite tape side by side upon a mandrel having a complex receiving surface of compound contour. Multiple adjacent courses of tape define a ply or layer upon the lay surface, and a laminated structure of complex contour is built up from a succession of such plies, each laid upon the previous one.

Each tape strip of a ply is laid by moving the tape head of the machine along a programmed course. The course is controlled from machine instructions generated from surface-defining orthogonal coordinates supplied to a path generator processor. The path generator processor generates tape course data based upon a number of system parameters such that the natural path of the composite tape on the complex surface is followed. "Natural path" as used here means that path which a tape will follow upon a contoured surface without stretching or puckering while being laid.

By programming the tape head to follow the natural or untensioned path of the composite tape, no unequal forces are exerted on the tape edges during the tape laying which could cause puckering of an edge. Each course will accordingly be laid in full contact with the receiving surface to produce an integral structure without interruptions or voids along the tape course. However, because the path generator processor chooses a course which causes the tape fibers to be tensioned uniformly across the width of the tape, the gaps between adjacent courses of tape will be relatively uncontrolled. Therefore, to insure reliability of the article, gaps between adjacent strips are held to a predetermined tolerance at least along a control line of the compound surface where it has been determined to be the most important. For example, in aerodynamic structures, the control line might be placed with particular reference to the area and direction of maximum stress in a wing or other surface.

The path generator processor generates a natural path for a composite tape course along the contoured surface by a technique in which the path is incrementally defined by a series of groups of points arranged transversely across the tape and representing the left edge, right edge, and center of the tape. Each set of geometric points, left, right and center, defines an ordered group positioned one step-size away from the previous group along the direction of the tape course on the lay surface. The groups are generated in sequence so that any change in the direction of the tape course occasioned by the surface contour will be known before the next group of points is determined.

After selecting the initial direction of a tape course and determining the initial starting group of points, the tape edges are set in a direction perpendicular to a line transverse to the axis of the tape. In this manner, the edges will be aligned in the direction of the course upon the surface, and the direction thereafter varied as necessary to prevent the tensioning of one tape edge more than the other. The natural path is determined incrementally by finding the next group of points on the surface which is closest to one increment of unstressed tape length away from the previous group of points in a direction perpendicular to a line drawn through the previous group of transverse points. After first locating the two edge points of each new group in that fashion, the center point is assumed to lie midway between the unstressed edge points, and the edge points are then adjusted to insure that they are not over one-half of a tape width away from the calculated center point.

This incremental method of generating each tape course insures the equality of tension over the width of the tape and the absence of puckering or wrinkling on either side. The path generator processor generates a plurality of these courses to form one layer or ply upon the mandrel surface, after which the surface definition data are updated or adjusted for the next ply to reflect the thickness of the previously laid ply.

The path processor is programmed to lay adjacent tape courses in opposite direction, i.e., by rotating the tape laying head 180 degrees when indexing it laterally for the next tape course, not only to minimize machine motion but also to minimize scrap, as most articles will be designed to have straight edges along which the complementary cut ends of the tape are aligned from strip to strip by rotating the tape head a half turn.

When an article has been defined in terms of the natural paths of the tape courses in each of the plies to be laid, that data is passed from the path generator processor to an interpreter processor which converts what is essentially geometric path data into tape laying machine instructions for the particular tape head to be used. This enables a part program to be moved from machine to machine without variance of the final product, as the interpreter processor provides to its associated tape laying head a machine-specific definition of the instructions necessary to move the tape head along the desired path.

Superimposed upon those instructions is an adaptive control which provides course correction refinement for the rapid movement of the tape head along the natural path, to allow for any discrepancies between the surface definition from which the natural tape paths were calculated by the path generator processor and the actual surface presented to the tape laying head.

These and other objectives, features, and aspects of the invention are explained in detail in the following description read in conjunction with the appended drawings, wherein:

BRIEF DESCRIPTION OF THE DRAWINGS

FIG. 5 is a pictorial representation of a surface and peripheral extent of an article on a contoured surface for the tape laying machine illustrated in FIG. 1;

FIG. 6 is a pictorial representation of a strip of composite tape with unidirectional filaments bound therein;

FIG. 7 is a pictorial representation of a compound contoured surface upon which the tape strip illustrated in FIG. 6 has been laid in a straight line path;

FIG. 8 is a pictorial representation of a compound contoured surface upon which the tape strip illustrated in FIG. 6 has been laid along a natural path;

FIGS. 9-12 are pictorial vector diagrams illustrating the natural path calculation along a compound curved surface by a course—ply generation routine of the part program generator illustrated in FIG. 4;

DETAILED DESCRIPTION OF THE PREFERRED EMBODIMENT

Figure 1:
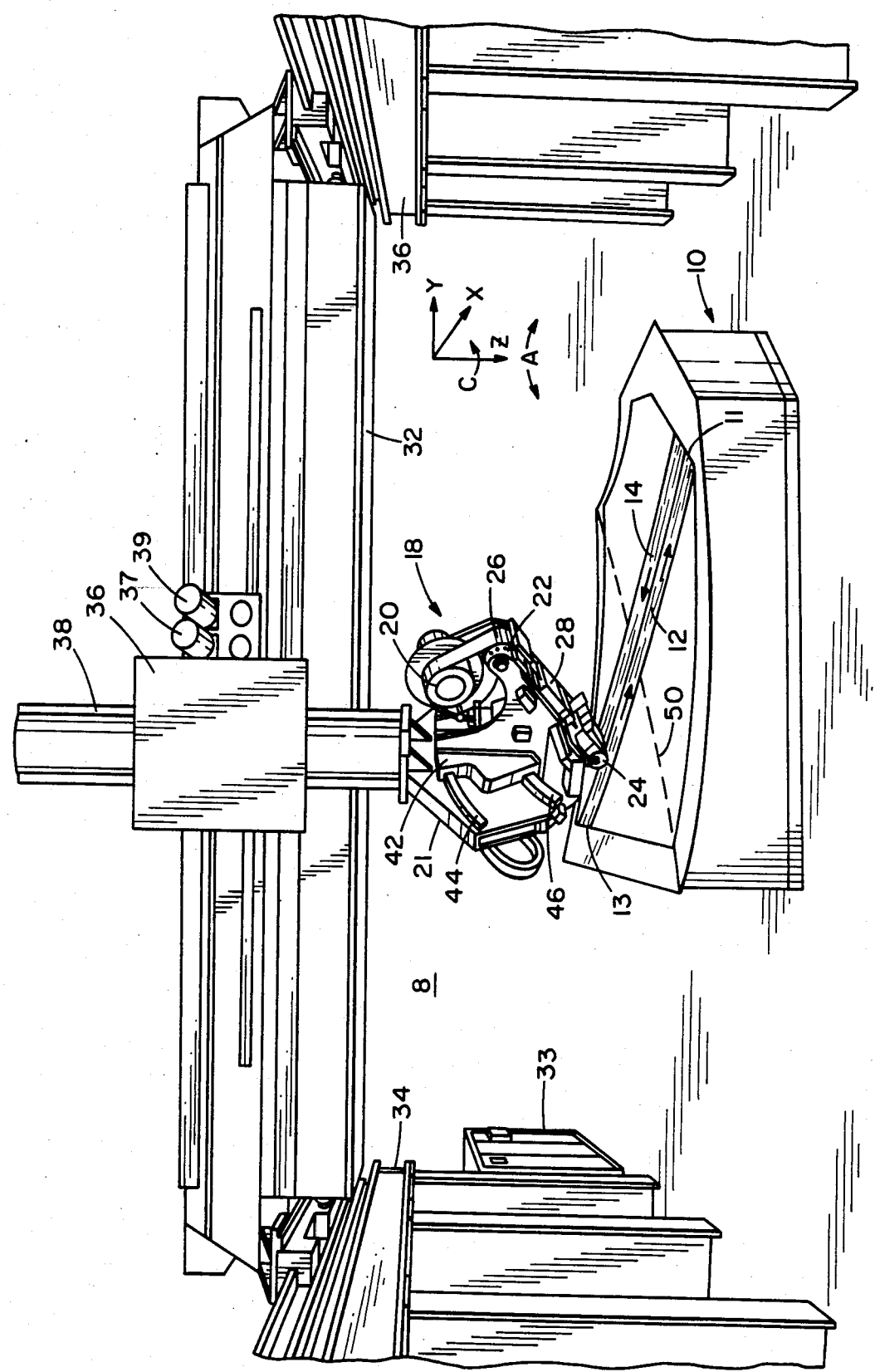
FIG. 1 is a perspective view of a tape laying machine which is constructed and operated in accordance with the invention.

In FIG. 1 there is shown a 5-axis tape laying machine 8 for depositing composite tape on a mandrel 10. The upwardly facing surface of the mandrel 10 is the compound contoured surface which will become the outer surface of a laminated article to be formed. Such surfaces may embody curvatures which vary in a changing manner, such as the aerodynamic surface of a wing with tapers and twists combined.

Composite tape strips 12 and 14 in a semitacky condition are adhered in adjacent courses to the surface of the mandrel 10 by a tape laying head 18. The tape head 18 carries a supply of the composite tape on a supply reel 20 from which it travels around a direction change idler roller 22 and then in a straight line diagonally downwardly to a set of press-down rollers 24 which apply the tacky composite tape to the mandrel lay surface as one course of the first ply. A multiplicity of courses and plies are built upon the mandrel 10 to form the laminated article. Each ply takes the shape of the underlying surface such that the compound curvatures of the surface of mandrel 10 are built into the article. When all of the plies have been laid, the mandrel 10 is moved to an autoclave (not shown) where temperature and pressure are controlled to cure and solidify the merged matrix material into an unified, fiber-reinforced composite article.

Figure 2:
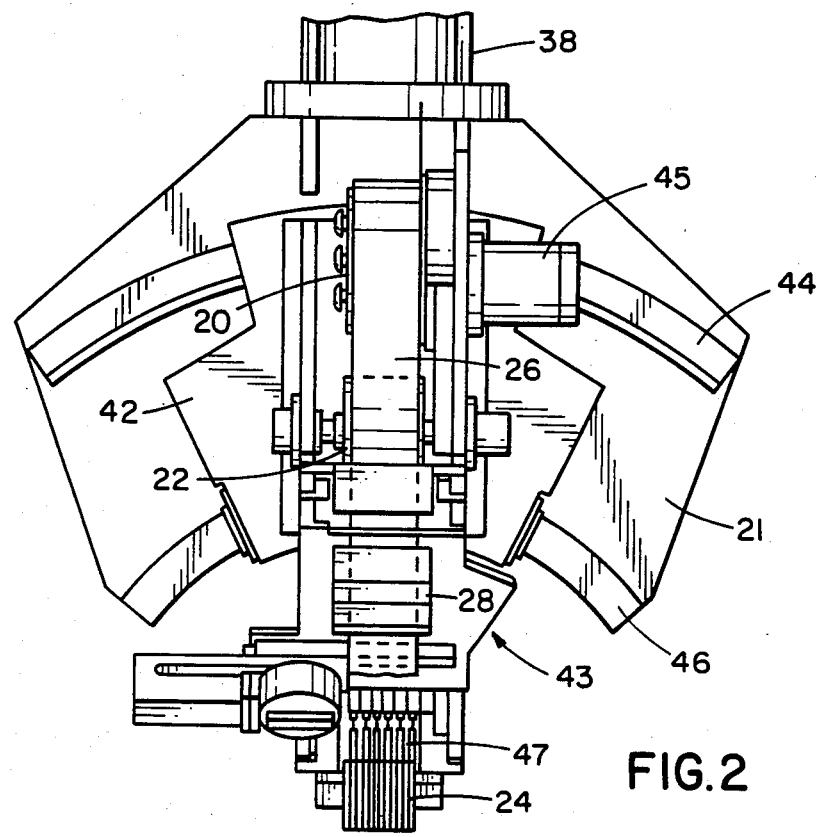
FIG. 2 is a partially broken front view of the tape laying head of the tape laying machine illustrated in FIG. 1.

As shown in FIG. 6, the composite tape strip 26 is provided with a releasable paper backing tape 25 which separates the coils of the composite tape while in the supply reel, and which carries the composite tape strip through a set of tape cutters 28 along the straight line course from the idler roll 22 to the press-down rollers 24. As better illustrated in FIGS. 2 and 3, the cutters 28 sever the composite tape 26 but not the backing tape 25. The backing tape 25 carries the composite tape 26 to the press-down roller 24, where it is peeled from the composite tape as the latter is laid upon the mandrel 10. The backing tape 25 then proceeds diagonally upwardly from the press-down rollers 24 through a double reversing course about a drive roll 27 and a pinch roll 29, and thence to a take-up reel 30.

During the laying of any given tape course, the tape is drawn from the supply reel at times merely by the movement of the tape head over the surface, and at other times by the tape drive itself. Once a predetermined amount of a course is laid, the drag or adhesion of the course to the surface will cause the tape to be drawn out as the head 18 is moved. For starting a course or ending a course, control over the feeding of the tape is maintained.

For this purpose, the supply reel and the paper tape take-up reel are each separately driven by torque motors 45 and 49 which are controlled to maintain the paper tape 25 in constant tension between the supply reel 20 and the take-up reel 30. The supply of tape on both reels is monitored by sensors 31 and 33 which measure the changing radius of the tape coil for the control of the opposing torque motors to maintain the desired level of tension in the backing tape 25. The pinch roll 29, when so urged by an air cylinder, presses the paper tape to the drive roll 27, which is powered reversibly by a servo motor provided with a resolver not only for the control of the driving servo motor, but also for measuring the amount of tape which has been laid, and for other purposes not here relevant. The servo drive motor "drives" the tape in either direction by upsetting the tension balance in the tape, thus calling the unloaded torque motor into action to restore the balance.

Four of the five axes of movement of the tape laying head are provided by its gantry suspension, which includes a pair of spaced parallel rails 34 and 36 supported upon columns above the lay mandrel 10, and spanned by a cross rail carriage 32 movable along the rails 34 and 36 to provide the X-axis movement. A saddle 35 movable along ways on the cross rail 32 provides Y-axis movement, with vertical or Z-axis movement provided by a ram 38 which is vertically slideable in the saddle. Rotation of the tape laying head about a vertical axis, termed the C-axis movement of the head, is provided by a rotary slide (not shown) within the ram 38.

The fifth axis of movement, termed A-axis movement, is a rotary movement of the tape head 18 about a horizontal axis in the central radial plane of the press-down roller 24 and tangent to the press-down roller 24 on its underside. The A-axis appears as a point projection in FIG. 2. For this movement, the tape head frame is divided into two relatively movable parts, a vertical turntable 42 rotationally secured to the mounting plate 21, and a saddle frame 43 which carries the tape handling mechanism. The turntable 42 is rotatable about the aforementioned A-axis upon spaced arcuate tracks 44 and 46 on the mounting plate 21 under the driving force of a servo motor 53 (FIG. 3) driving a pinion engaged with a gear segment (not shown) on the turntable.

Figure 3:
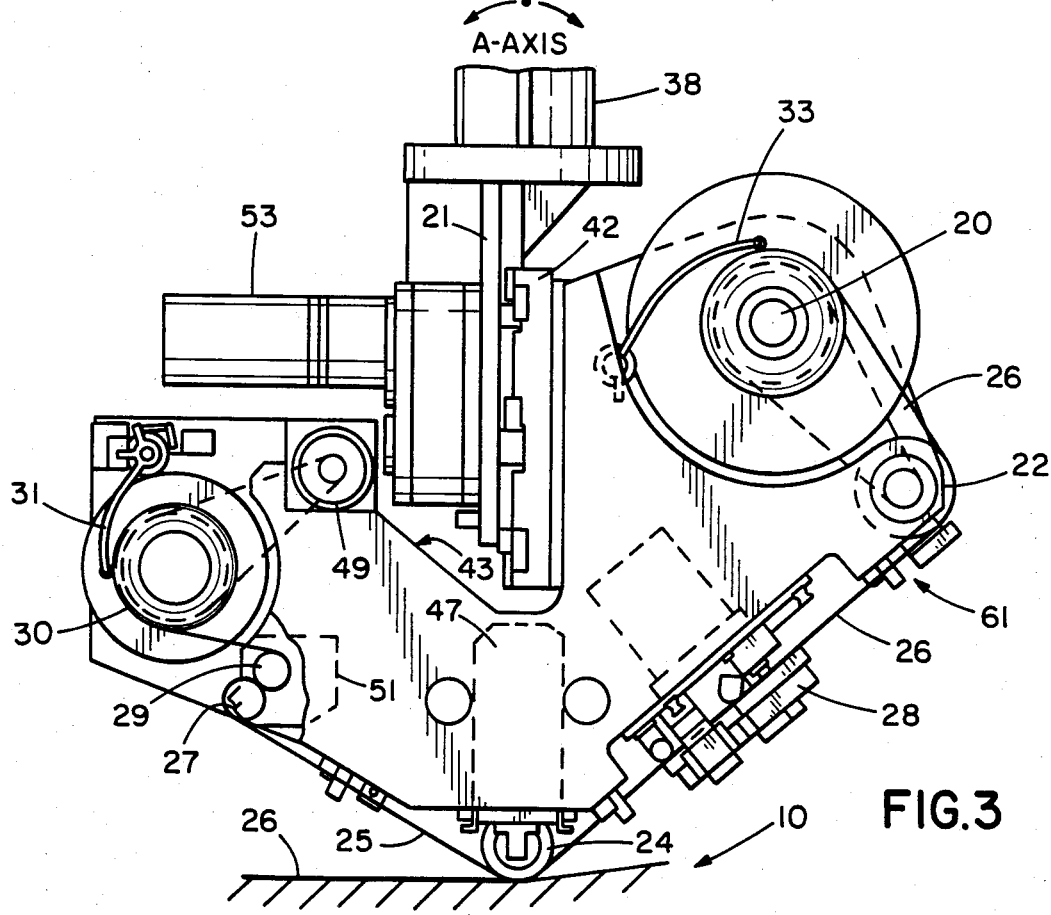
FIG. 3 is a partially broken side view of the tape laying head of the tape laying machine illustrated in FIG. 1.

Movement on all axes is controlled by servo motors of which the Z-axis and C-axis servo motors 37 and 39 are seen in FIG. 1, and the A-axis motor 53 in FIG. 3. The X-axis and Y-axis servo motors control movement of the gantry suspension of the tape laying head 18 by geared rotation. Electrical control signals for causing operation of the axis servo motors and other tape laying operations are provided by an electrical control unit 33.

The movements of the tape head 18 define positions in an internal coordinate system of the tape laying machine 8 for the five axis movement including coordinates for the X, Y, Z, C, A-axes. Commanding the tape head position to a particular X, Y, Z coordinate point defines the position of the center of the pressure rollers 24 with respect to an internal reference point and is used to locate the head with respect to a position on the surface of mandrel 10. Commanding the tape head position to a particular C coordinate pivots the tape head 18 with respect to an internal reference and is used to follow tape course paths which curve in order to maintain the pressure rollers 24 squarely on the entire width of tape. Commanding the tape head position to a particular A coordinate tilts the tape assembly carriage 61 with respect to an internal reference and is used to maintain the pressure rollers 24 squarely on the tape when a course is being laid transversely to the slope of a contour.

Feedback sensors are used in an adaptive control to insure that the commanded positions of the tape head 18 actually match the surface being laid with tape. For Z-axis positioning errors, the pressure applied by pressure servos 47 on pressure rollers 24 is monitored to determine if the surface is actually where the tape head is being positioned. An increase in pressure indicates the surface is higher (Z-axis) than expected and a decrease in pressure indicates that it is lower than expected. The A-axis is monitored in a similar manner by determining the pressure differential from side to side on the pressure rollers 24. If the high side roller is exerting a greater pressure than the low side roller, then the tilt angle should be increased. If the low side roller is exerting a greater pressure, then the tilt angle should be decreased. C-axis motions are monitored with optical sensors at the edges of the tape to determine if the tape is setting squarely under the rollers. If a tape edge is detected by an optical sensor, the tape head must be pivoted about the C-axis to follow the actual tape movement and recenter the tape.

The multi-axis tape laying machine 8 by generating complex motions along the described axes can lay composite tape in substantially parallel courses over the surface of the mandrel 10. A plurality of these courses forming a ply comprise one layer of an article covering a portion of the mandrel surface between a predetermined periphery. A laminated article can then be provided by successively overlaying plies to the required thickness. By automatically controlling the motions of the tape laying machine 8 with electrical signals from the control unit 33, laminated articles can be easily and rapidly be produced Further, because of the combination of the natural path generation and the adaptive control articles are more precisely and rapidly produced than articles made by prior art composite tape laying apparatus.

In general, the motion of the tape laying machine 8 is controlled along a course, for example 14, from one peripheral edge 11 of the article to be formed at an angle to an imaginery control line 50 to another peripheral edge 13 of the article. At the termination of the course, the cutters 28 cut the tape so that it can be rolled flat against the mandrel 10. The tape head 18 is then pivoted 180° and the next parallel course, for example 12, is laid in the opposite direction. The control line 50 is a place where the gaps between adjacent courses are defined to be closely controlled. Otherwise the gaps between the tape courses follow the natural contour of the surface of mandrel 10 or other plies such that the tension is not unequally applied to the edges of the tape strip 26.

Figure 4:
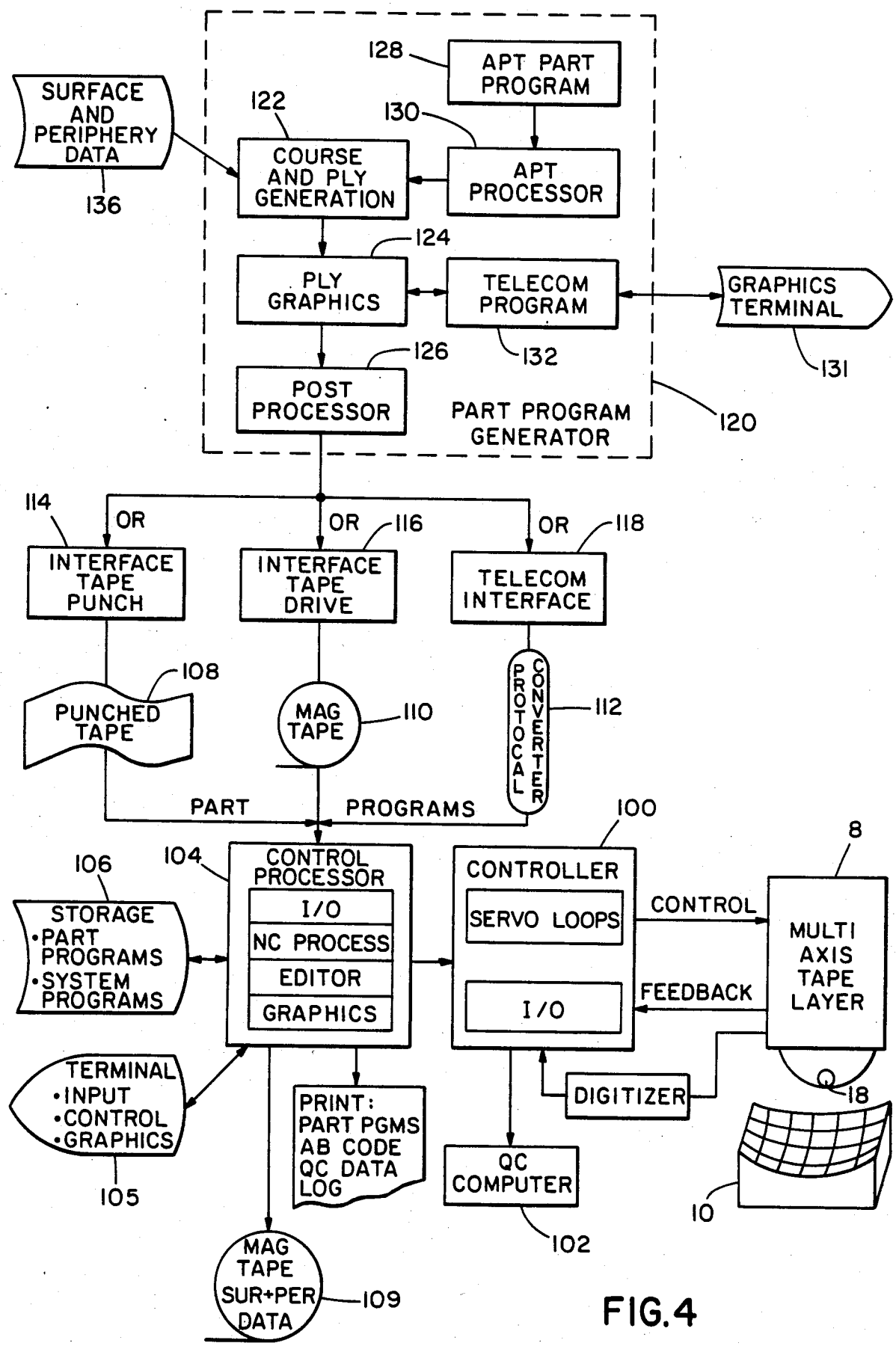
FIG. 4 is a detailed block diagram of a part program generator, control processor, and controller which control the operation of the tape laying machine illustrated in FIG. 1.

As more fully seen in the block diagram of FIG. 4, the motions of the tape laying machine 8 are regulated by the control unit 33 including a controller 100 which produces electrical control signals and receives the feedback signals to position the tape laying head 18 according to commands of a part program. The part program defines the desired position in space of the tape laying head 18 and the feedback signals indicate the actual position of the head to the controller 100. The difference in these signals is nulled in a closed loop until the actual position equals the desired position such that the tape is layed in a precise manner. Signals indicating the difference between the actual and desired positions may be provided to a satellite quality control computer 102 to determine whether the tape is being laid correctly and to store the results of the actual lay.

The controller 100 is a CNC machine which can execute a extensive and detailed part program a portion at a time by being periodically supplied with sequentially generated control blocks. These control blocks contain detailed motion and control information in each block and are comprised of series of standardized control function implementations for the particular tape laying machine 8. Executing the control blocks causes the actual physical tape laying head 18 motion and control.

In the present system the controller 100 is implemented as an Alan Bradley 8200 CNC controller, or equivalent CNC controller, which can be programmed to regulate motion and control of the 5-axis tape laying machine 8. The program of the controller 100 implements a closed loop control which is given desired position commands by the control processor 104. These position commands are executed by the controller 100 to position the tape head 18 in a normal closed loop manner. These positions are modified for actual surface conditions for the A, C, and Z-axes by the adaptive feedback signals mentioned previously. The adaptive control actively regulates the pressure of the rollers 24 (Z-axis positioning) to maintain surface contact with a substantially constant application pressure, actively regulates the A-axis positioning to maintain equal pressure on the rollers 24 from side to side, and actively regulates the C-axis positioning to maintain the tape squarely under the rollers 24.

The control blocks of machine instructions are generated to the controller 100 by a control or interpreter processor 104. The control blocks are generated by the interpreter processor 104 from part programs generated by part program generator 120 and previously generated part programs stored in a system storage unit 106. The part programs, comprising a plurality of tape blocks, are in a geometric format relative to the natural tape path of each course. Each tape block contains all the geometric information for one course of a ply but the data is not machine specific. The controller 100, however, only recognizes regular machine instructions or commands representative of a single machine action or canned cycle machine instruction commands indicating a plurality of machine actions in a single block. The course tape blocks contain complex information which command many more machine actions, such as axis motion, sheer and cutter control, roller control, and other miscellaneous functions. Therefore, this complex course data must be interpreted and converted into the machine instructions that the controller 100 recognizes. This is the function of the interpreter processor 104 which expands the tape course blocks into detailed motion and control blocks of machine instructions recognizable by the controller 100.

The part program generator 120 accepts basic article information from a surface and periphery data file 136 and automatically generates the tape courses based on a natural path which are output as a part program from a post processor 126. The tape course information or part program from the post processor 126 can be communicated to the control processor 104 through any of the three interfaces 114, 116, and 118. The part program may be interfaced through a tape punch 114 by punch tape 108, output on magnetic tape 110 through an tape drive interface 116, or interfaced directly through a telecommunications interface 118 and a protocol converter 112.

The information used to generate the tape course data from the surface and periphery data files 136 is a rectangular array of points obtained from a mathematical description of the surface of the mandrel 10, the peripheral outline of the plies to be laid, one or more control lines indicating areas where the gaps between courses are to be held at a close tolerance, and the angle at which the courses of each ply should be laid with respect to the X-axis.

The program generator 120 receives this information and uses a conventional APT processor program 130 to assemble a basic part program shell. The program shell consists of geometric information describing the article to be manufactured by the number and position of the plies and the general direction and configuration of the tape courses. This shell is made from the surface information stored in data file 136 and from command data previously stored as standard APT part programs from file 128. The APT processor 130 is a program providing the necessary software tools for a part programmer to assemble the part program shell from these two data sources. The part program shell essentially describes the article in the geometric terms of plies but without natural path data included.

Once the shell program is assembled from the various sources of data, it can be expanded by a course and ply generation routine 122 to include natural path data for the tape courses. The course and ply generation routine 122 may be commanded to generate a whole ply or to generate individual courses with natural paths for the control processor 104. When a command is given to generate a ply, the system automatically computes all the natural paths and end cuts for each course covering the area bounded by the ply periphery. The gaps between the courses of the ply are kept at a specified tolerance along the control lines and the direction of the tape lay is reversed 180° between two adjacent courses to minimize machine motion and scrap. After the courses of one ply are generated, the surface data in memory are updated to reflect the thickness of the new ply.

The part program generator 120 provides a graphics monitor 134 where the generated courses of the composite tape can be visually inspected by an operator on a graphics display. With the aid of the graphics monitor 134, a part programmer through the keyboard of the monitor can make adjustments to the courses to provide more control over the gap and overlaps of the tape courses for a ply.

FIG. 5 illustrates a graphical representation of the data which is input to the part program generator 120. The initial or starting surface of the mandrel 10 is mathematically represented by surface 201 as a number of rectangular coordinate points forming a grid. The grid lines are equally spaced along the surface of the X-Y plane 202 a real distance apart, such as one inch. The grid points are stored in the sequential data file 136 such that the X, Y, and Z coordinates of each surface point are maintained for operation by the part program generation. For the preferred implementation, the maximum size of a grid is 600×160 grid points.

Projected on the surface 201 is a ply periphery 204 which defines the outermost edges of the finished article on the mandrel. The ply periphery 204 is projected from the X, Y plane such that the same termination criteria for the courses may be used for all the different plies by projection. The surface 201 described by the grid points is extended at least some distance beyond the edges of the intended article because during natural tape path calculation some of the edge points calculated may end up outside of the edges of the part. To correctly calculate these points, the surface extention is necessary.

A control line 205 is also provided for determining an area along which the gaps between courses of tape are closely controlled. The control line 205 is further defined in the X, Y plane such that it may be projected upon each ply similar to the manner that the periphery 204 was projected. One ply of composite tape laid on the surface 201 is shown, as is the projection 204' of the ply periphery onto the Z coordinates of the surface 201. The control line projection 205' from the control line 205 is also shown.

Each course, for example 207, 209, 211, follows a natural path on the surface or contour 201 without putting unequal tension on the edges of the course and has its ends cut to fit within the periphery. Each course is laid on the surface in an opposite direction to the one adjacent to it to minimize tape waste and machine motion. The gaps between adjacent courses, for example, 213 between courses 207 and 209, and 215 between courses 209 and 211 are controlled to a very close tolerance along control line projection 205' but are not as closely regulated away from that line. General angles that the tape courses make with respect to the X-axis are 0°, 45°, and 90°. Further, particularly for the 45° application, plies may alternate from +45° to −45° so that the courses of adjacent plies will crisscross for strength in the building of an article. However, it is readily evident that any angle with respect to a reference may be used.

The computation of the natural path is basically as follows. First, a load point 219 on the X-Y plane is chosen corresponding to projected point 221 where the natural path on the surface 201 will cross the projected control line 205'. The course path is now split into two paths, with each path starting at point 221 and being computed in opposite directions at a control angle until they intercept the opposite ply periphery segments 223, 225. The computed path points are then merged into one path and rearranged to have a path direction opposite to that of the an adjacent course. The initial course angle is measured with respect to the X-axis at the point where the center of the course crosses the control line.

There are several distinct advantages to this method of calculating a natural tape path on a complex contoured surface. Initially the gap distance 213, 215 between tape courses on the control line can be readily regulated because the load points are picked along it. Further, the natural path is generated in both directions from the control line such that, although the gaps are not tightly controlled, the tension in the edges of the tape are minimized. This prevents wrinkling, overlays, and other detrimental positionings of the tape. Moreover, the angular orientation tape courses with respect to the control line allow a efficient use of the tape while minimizing the complexity of the end cuts. It is desirable to lay the composite tape at an angle transverse to the control line such that strength is maintained in the composite article but efficient use of the tape product is also provided.

A strip of the composite tape is pictorially illustrated in FIG. 6. The composite tape comprises a semitacky resin base 26 which is in strip form that supports and surrounds a multiplicity of reinforcing filaments 206 held in suspension substantially parallel to the longitudinal direction of the tape. The resin base 26 is overlaid with a nonsticking backing tape 25 to which pressure can be applied to stick the base 26 to a surface. After adhering the base 26 to a surface, the backing web 25 can be peeled away from the base, thereafter permitting a curing step which hardens the resin and sets the filaments 206 in a particular orientation in the matrix. It is noted that substantially all of the filaments run in a unidirectional manner making the tape relatively flexible (bendable) in either the lateral or longitudinal directions. However, for most composite tapes in general, and for composite tapes of carbon fiber or graphite filaments in particular, the tensile strength of the fibers makes the tapes relatively unstretchable in the longitudinal direction.

The tackiness or stickiness of the base 26 may be varied by the temperature at which the tape is applied. The warmer the tape is, the more fluid and tacky the base will be, but also the more difficult to apply to a surface. Generally, applying pressure to a moderately tacky base 26 is the preferred method for laying the tape on a surface, such as mandrel 10, or on top of previously laid plies. To reach the desired tackiness the tape is generally stored in a refrigerated area until just before use. This allows the resin base of the tape to become semisolid and maintain a relatively constant thickness through application and curing.

FIG. 7 and 8 will now be more fully explained to describe the necessity for natural path tape courses on a complex curved surface. FIG. 7 illustrates a surface 216 with a compound curvature or feature 210 which begins as a mound of a certain cross section and tapers to a flat area on the surface 216 on one end. If a straight line path in the direction of arrow 201 is taken by a tape laying machine across the feature 210, then edge 212 will have to cover more distance across the taper of feature 210 than edge 214. This will result in one of two defects in a tape lay. If the tape is stretchable, the edge 212 will be stretched and the tape strip 26 will be thinned at the point of the feature leaving a defect. The other defect, however, occurs when a nonstretchable tape is used. Because the filaments 206 and the tape strip base 26 are in a unidirectional orientation with the longitudinal direction of the tape, edge 212 will not be able to stretch and therefore, will be laid flat on the longer taper of feature 210. However, edge 214 which must cover the same distance as edge 212 will then wrinkle or pucker as shown in the drawing to provide a defect. This wrinkle 214 produces a localized defect in the particular tape ply of which the course is a part. These defects when the resin of the matrix is cured will produce places where the fibers will not carry their designed tensile loads, which could cause articles to be unacceptable and rejected.

FIG. 8 shows that to lay the tape base 26 flat on the surface 216 without wrinkling either of the sides 212 or 214, the natural path of the tape must be followed. The natural path begins in the same direction in which the tape base 26 started for a path, that of arrow 201. However, when the tape path leaves the flat part of surface 216 to begin its overlay of feature 210, it will find that side 212 is generally traveling a longer distance per unit distance of forward direction (arrow 201) than side 214. Therefore, the tape must start to curve in direction of arrow 203 to compensate for this difference. This changes the tape direction to that of arrow 203 after the tape base 26 begins on the flat portion of surface 214 once more. By incrementally changing the direction or curvature of the tape direction across feature 210, the outside edge 214 travels an outer curvature which is greater than the inside curvature traveled by edge 212. This extra curvature for edge 214, makes up the difference because of the increased taper in the direction of arrow 201. Therefore, neither edge 212 or 214 are stretched or wrinkled and lie flat on the surface 216. Only the tape path direction has been altered slightly.

For complex contoured surfaces with many features like that shown as 210 on surface 216 relatively complex tape course paths would have to be determined. Further, it is seen that once the natural path for one course, such as that shown as 26 on surface 216 in FIG. 8, is used the next course which is substantially parallel to it cannot be a straight line path as shown by arrow 201 because it would overlap the first course if on side 212 or would leave a large gap if on side 214. Further it is seen that the natural path for a tape on either side of the course shown as 26 in FIG. 8 will be different from the illustrated natural path because the feature 210 changes differently on either side.

Because the natural path of a tape strip on a compound contoured surface cannot be easily predicted, the invention uses the course and ply generation routine 122 of the part program generator 120 to calculate a natural path for each course in the form of an array of geometric points defining the motion of the tape laying head 18 over a surface, whether that of mandrel 10 or a lower ply. The course and ply generation routine 122 calls an iterative routine labeled PATHCK to incrementally calculate the points along this path by making approximations about where the tape would lay on the surface in an unstretched condition one increment of distance away from the last set of points calculated. The tape course direction is corrected from its previous direction (originally the course angle) to account for uneven edge lay distance in the general tape direction.

Thus, course direction is corrected between sets of points on the surface at relatively equal increments of surface distance from each other. If the contoured surface is not changing more rapidly between the two tape edges than the difference in the radius of curvature for the change in tape direction, then the tape will lay flat along its natural path. The procedure depends upon tape width and increment size. The wider the tape, the more one edge can vary in the tape course direction with respect to another and, thus, the more angular correction which will need to be applied to equalize the edges. Additionally, the longer the increment in the calculation between points, the less angular correction which can be applied.

Generally, for more rapidly changing contours and features of a surface, narrower tape widths and smaller increments of step size are used to allow the change in tape direction to be able to compensate for unequal tape edge lays. Of course, the limiting increment size for a routine as described here is the distance between array points on the surface. The resolution of the natural path on the surface can be no better than the resolution of the surface itself. The width of the tape in general, is limited by the commercial manufacturer to the 1", 3", and 6" sizes discussed previously. For the purposes of manufacturing effeciency, the tape width should be as wide as possible and the increment as long as possible to allow a surface to be covered quickly.

The routine PATHCK calculates a set of points for the left edge, right edge, and center of the tape which is the best fit to the surface for each increment along a course path within the constraints of not stretching a tape edge. These constraints contemplate that each new edge point will be one increment of distance along the surface away from the last edge point, that each new edge point will be on the surface, and in a direction which will be perpendicular to a line drawn through the last center and edge point. The course direction is allowed to change and compensate for contour change so that the constraints for not stretching the tape can be met.

Figure 14:
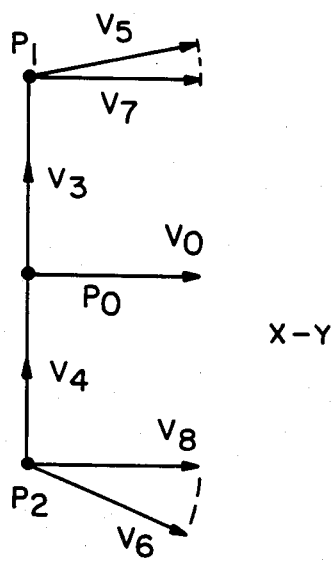
FIG. 14 is a pictorial vector diagram of a top view of the process illustrated in FIGS. 10 and 11.
Figure 15A:
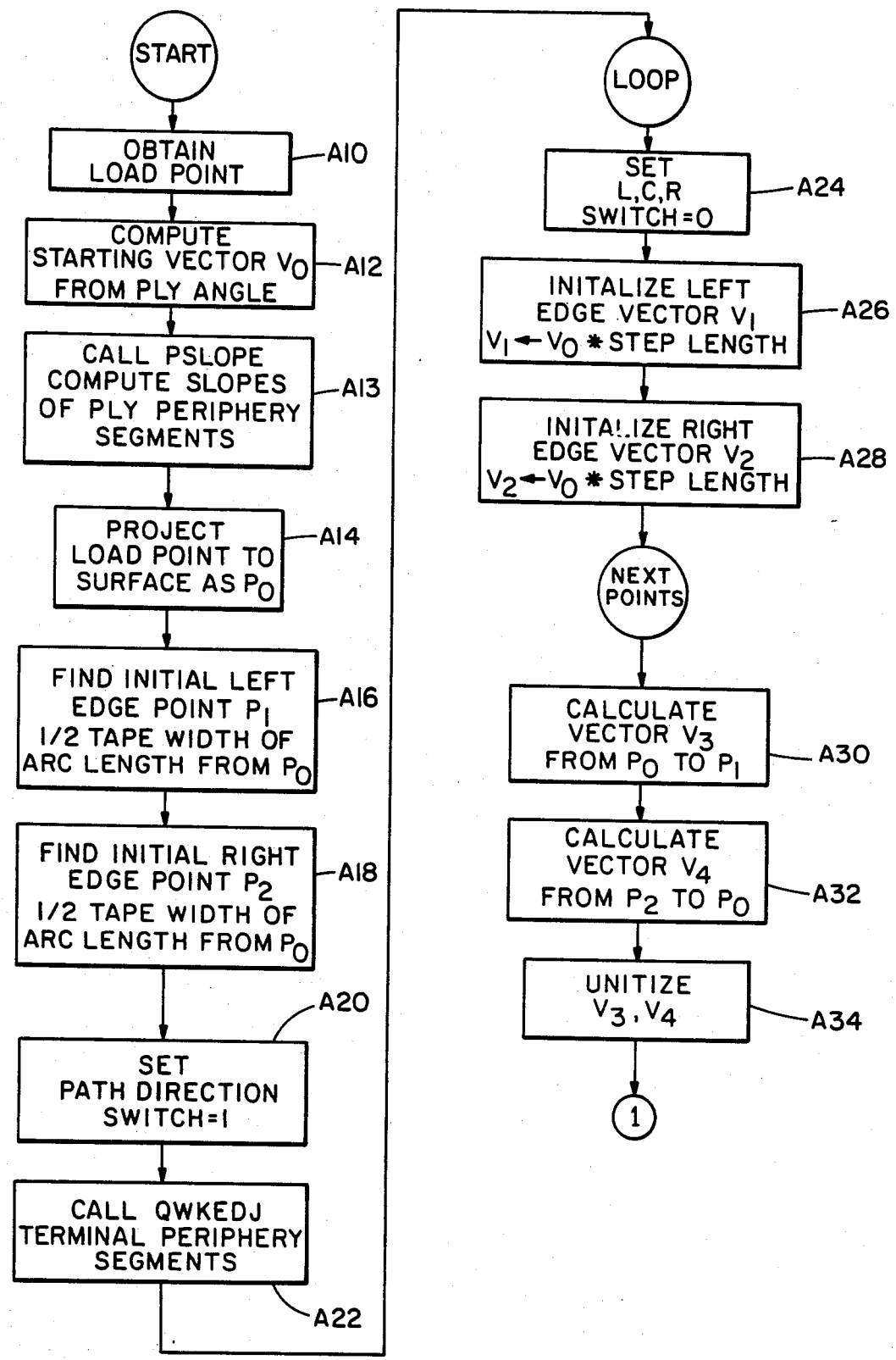
FIGS. 15A-15C are a detailed system flow chart of the natural path generation routine for the course and ply generation program of the program generator illustrated in FIG. 4.
Figure 15B:
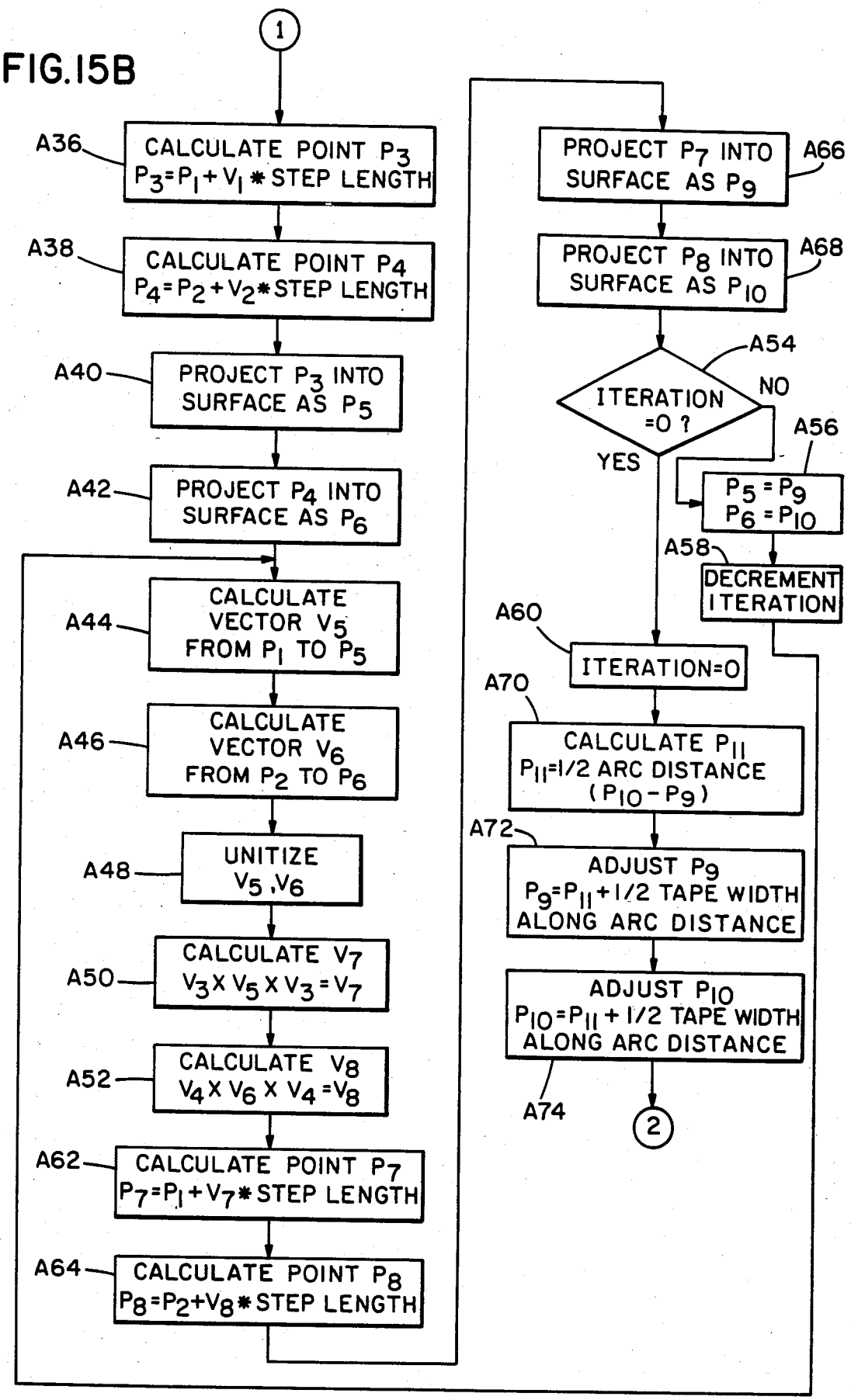
Figure 15C:
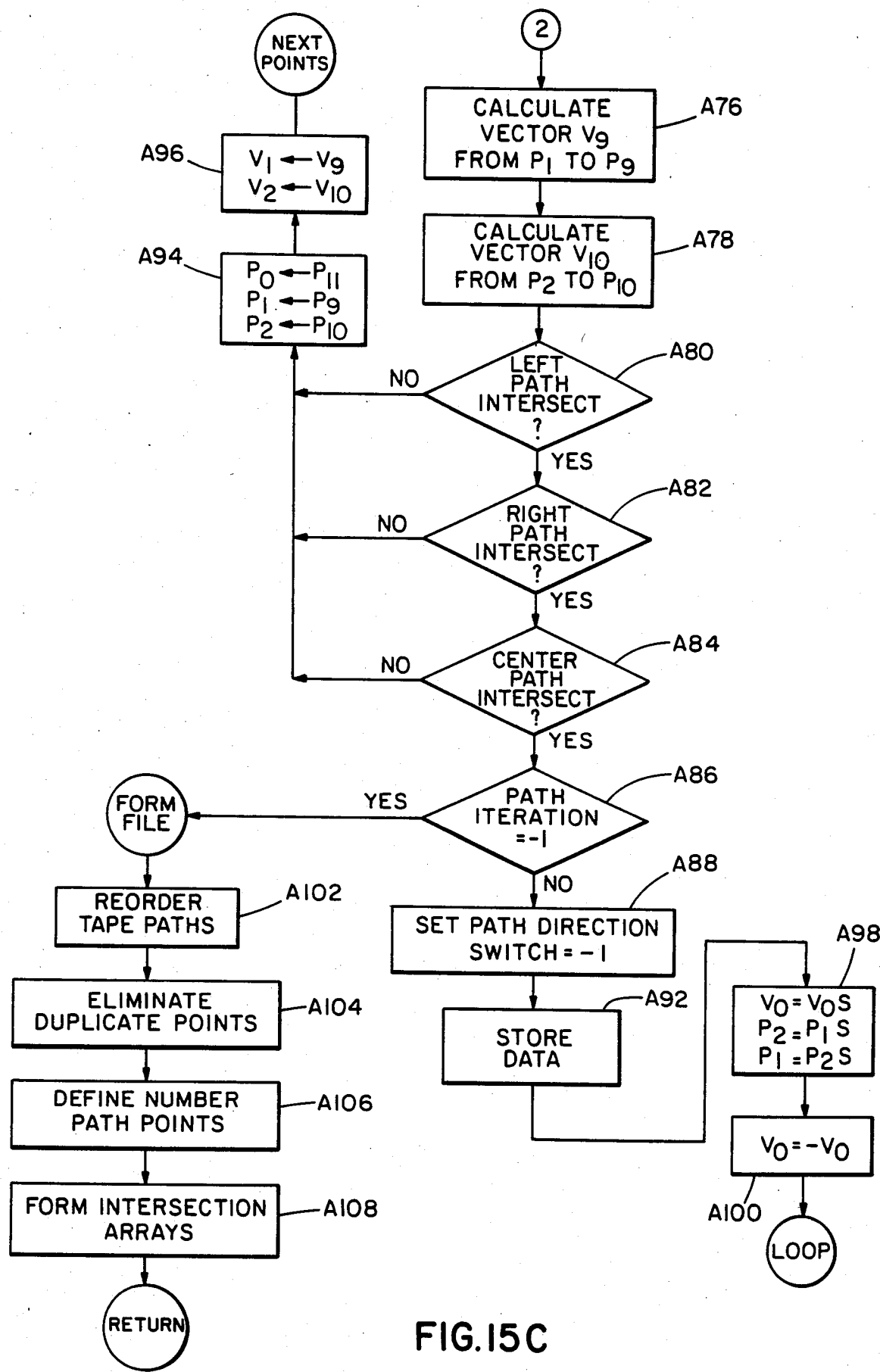

With respect now to FIGS. 15A-15C there are shown a detailed flow chart of the routine PATHCK which is called by the path generator program 120 to generate natural path data for a course of composite tape on a compound contoured surface. The vectors diagrams, FIGS. 9-14 will also be referenced to illustrate pictorially the natural path generation by the routine. The routine computes a natural path that would cause the tape laying head 18 to lay a strip of composite tape flat over a contoured surface without stretching, bunching or wrinkling the tape. The input requirements of the routine are an initial load point defined on the control line 205, a ply angle A defined with respect to the X-axis, and the width of the tape. Further, the routine uses information about the ply periphery and the number of periphery segments. The routine PATHCK combines the foregoing information with the rectangular array of the points describing surface 201 and calculates the natural path of a course as a series of incremental steps along the left edge, right edge, and center path where the increment is an input variable termed the iteration step size.

The load point indicates the course position in a particular ply and the ply angle indicates the general tape direction over the surface. The initial direction information is varied by the routine to take into account the constraints for not stretching the tape by fitting a tape of the given width and increment size to the surface data. To maintain defined gap widths along the control line the path calculation for each course is accomplished in two parts.

The path calculation begins by obtaining the load point in block A10 and then proceeds calculating sets of points in what is termed in the +ply angle direction. After calculating one-half of the course, for example, from point 211 to periphery segment 233 (FIG. 5), the program resteps in the −ply angle direction, for example, from point 211 to periphery segment 225. Each successive iteration of path points will be located a incremental or step size away from the previously calculated path points. The iteration will continue approximately along the indicated ply angle until the periphery has been exited by the last of the three tape paths referred to as the left edge path, right edge path, and center line path.

After the path calculation routine obtains the load point 219 for a course, it is projected onto the surface 201 and the starting vector V0 is obtained as a unit vector in the direction of the ply angle in block A12. A routine PSLOPE is called in block A13 to compute the slopes of the ply periphery segments for later use. The projected load point on the surface 201 is termed P0 in block A14 and the routine continues in block A16 and A18 by finding the left and right (as referenced to tape lay direction) tape edge points corresponding to point P0. FIG. 9 illustrates the point 219 on the load line 205 (X-Y plane of FIG. 5) being projected to the surface 201 represented by a line through points P0, P1, P2. The initial left edge point is termed point P1 and the initial right edge point is termed point P2. This operation is performed by a subroutine labeled EDGES whose input includes the tape width, the load point P0, and the ply angle. The subroutine EDGES will receive the data and compute vectors normal (in the X, Y plane) to the ply angle vector V0. These vectors will be forced to have a magnitude of one-half of the tape width and tentative left and right tape edge points will be defined as being one-half a tape width in displacement along those vectors from the load point P0. Subroutines labeled CORNER and INTERP will be used to define the Z heights of the new points P1, P2 on the surface. A calculation will then be made to determine the length of the vectors from the load point to the tentative left and right edge points. A correction will then be obtained to force these vectors to have a magnitude of one-half of the tape width and an iteration performed until good initial values for the points P1 and P2 are obtained. These routines will then place points P1 and P2 perpendicularly to the ply angle direction and one-half a tape width in surface distance away from the initial load point P0.

This operation locates the first set of points P0, P1, P2 as on the surface and along a line connecting them perpendicular to the direction of proposed tape travel V0. Note that P0, P1, and P2 may have different Z-heights and thus, it is important to determine that each is ½ a tape width away from the center point. The routine is now ready to make its first attempt at fitting the surface with the next points of a natural path.

Next in blocks A20, A22, and A24 there are performed operations which set up the tape path routine for going in the positive direction. First, in block A24 the left, center, and right switch is set to zero indicating that an intersection of these paths with the ply periphery has not yet been completed. In block A20, the path direction switch is set to one indicating a calculation of a natural path in the ply angle direction. A subroutine QWKEDJ is next called in block A22 to determine the terminal periphery segments.

The subroutine QWKEDJ will compute all the possible intersections that a tape path directed along the ply angle might make with the ply periphery. Each tape path is extended in the direction of the ply angle to determine a line. The line is extended from the load path point P0 in both the ±ply angle directions and a tolerance band is set up on either side of the line. The tolerance bands around the line define the outermost extremes on the surface within which the tape path must stay. Each end of this line is then intersected with the ply periphery at the Z height of the surface or ply being calculated. The information regarding which periphery segments are intersected are saved for subsequent use by a subroutine checking for ply periphery intersection. When iterating in one direction, the path calculation routine will stop when all three tape paths have intersected the ply periphery for a final time.

Path calculation continues in blocks A26 and A28 by defining a delta left vector V1 and a delta right vector V2. The vectors V1 and V2 are initialized to be parallel (in the same direction) to the ply angle vector V0 and to be equal in magnitude to the step size or iteration parameter, i.e.,:

$$V1 = V0 \times \text{step length}$$

$$V2 = V0 \times \text{step length}$$

At this point, the routine is at an address labeled NEXT POINTS: This is the beginning of the loop to calculate the next left edge point and the next right edge point. In blocks A30 and A32, vectors V3 and V4 (FIG. 9), are calculated in a direction from point P0 to point P1 and in a direction from point P2 to point P0, respectively. After the direction of the vectors V3 and V4 have been determined in block A34, their lengths are unitized. The next tentative left edge point P3 is calculated as a step length away from point P1 in the direction of vector V1 as indicated in block A36. A similar calculation is made to tentatively locate the next right edge point P4 in block A38. P4 is the point which is one step length away from point P2 in the direction of vector V2.

The points P3, P4 are in the direction of the tape path V0 and meet two of the three constraints set up for finding the next path points. First they are in a direction perpendicular to the line drawn through the last points P0, P1, P2. Secondly, they are one step length away from the last data points P1, P2. They, however, do not meet the last constraint which is that they must actually be on the surface.

Therefore, because points P3, P4 are only tentative points, they must be adjusted to insure that they are on the surface 201 on which tape is to be laid (i.e., they must be real points). Therefore, in block A40 and A42 the routine calls subroutines labeled CORNER and INTER to project these points (extend their Z height) onto the surface 201. The new left and right edge points from the projection are real points on the surface 201 and are labeled points P5 and P6. Next, in block A44 and A46, vectors V5 and V6 are calculated from the points P1 to P5 and points P2 to P6, respectively. Thus, vector V5 is calculated as the vector direction along the left edge of the tape between two real points on the surface (P1, P5) and vector V6 is calculated as the vector direction along the right edge of the tape between two real surface points (P2, P6). Thereafter, the vectors V5 and V6 are unitized in block A48 to insure that only a single step length will be taken per iteration.

This step has fulfilled the constraint that the new points must lie on the surface but has broken the other two constraints. By projecting points P3 and P4 to the surface as points P5 and P6, respectively, their distance away from points P1, P2 are no longer one step length and they are not in a perpendicular orientation. However, the vector direction of the tape edges have been adjusted slightly to take into account the different Z-heights between the last and next tentative edge points. This direction is relatively better than the original tape direction and will be approximated again in the next steps.

FIG. 10 illustrates the method up to this point where the last or previous left, right, and center points P0, P1, P2 have been tentatively projected to points P5 and P6 on surface 201 as adjusted for direction based on actual surface change. Thereafter, a new vector V7 is calculated in block A50 which has the following properties, $$V3 \cdot V7 = 0, \text{ and}$$

$$V3 \times V5 \times V3 = V7$$

and another vector V8 is calculated in block A52 such that $$V4 \cdot V8 = 0, \text{ and}$$

$$V4 \times V6 \times V4 = V8.$$

These equations are used to calculate in the case of the left edge, a vector V7 (FIG. 10) which is perpendicular to the vector V3 and which lies in the plane formed by the vectors V5 and V3. Similarly, for the right edge, a vector V8 is selected which is perpendicular to the vector V4 and lies in the plane formed by the vectors V4 and V6. This operation provides a directional vector for each edge which is in the direction of the natural path (i.e., is in the plane of vectors V5 and V7) and is further perpendicular to the last three path points such that the edges will lay straight without wrinkling.

The tentative points P5, P6 are changed to points P7, P9 by traveling one step length from points P1, P2 in the V5, and V8 directions, respectively, in blocks A62 and A64. This operation brings the points back into perpendicularity and sets them one step length away from the last points P1, P2 by changing the course direction angles to V7, V8, respectively. However, as was the case previously, points P7, P8 do not lie on the surface although they are closer than P3, P4 and are in a slightly better direction V7, V8. Therefore, as illustrated in FIG. 11, the points P7, P8 are projected to the surface 201 as points P9, P10, respectively, in blocks A66, A68. Again the projection slightly unbalances the perpendicularity and distance constraints such that iterative calculations are made to insure the closest match of a surface point for all constraints.

Accordingly, in block A54, an iteration number is tested to determine whether it is equal to zero. If it is not, a loop is formed by passing control back to block A36 after passing through the operations of block 56 and A58. Block A56 replaces the point P5 with point P9 and point P6 with point P10. Block A58 decrements the iteration variable so that this loop is performed a predetermined number of times. Thus, the directional vectors V7 and V8 which are natural path direction vectors, are calculated a number of times through the loop to more accurately find the natural path in conformance with the constraints. Once the iterations for calculating vectors V7 and V8 are complete, the iteration variable is reset in block A60, to 3 in the present embodiment, before the program continues.

Figure 13:
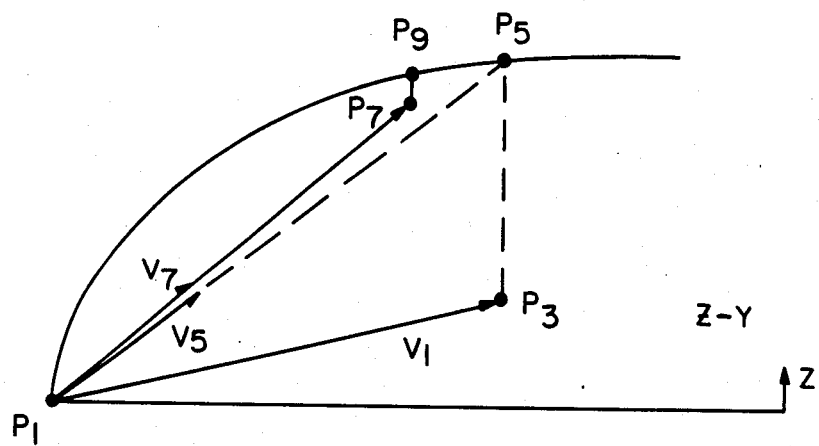
FIG. 13 is a pictorial vector diagram of a side view of the process illustrated in FIGS. 9, 10, and 11.

FIGS. 13 and 14 illustrate how this interative process through block A44–A68 establishes a point in a particular direction, a step length from the last point, and on the surface. FIG. 13 shows from an X-Z plane sideview that the direction vector V1, although perpendicular and the right length, may locate point P3 far off the surface 201. By projecting to P5, another vector V5 is found which is closer to the correct direction but is nonperpendicular and the wrong length. By adjusting to perpendicularity as shown in the X-Y plane view of FIG. 14, the V5 direction is changed to the V7 direction and a unit length taken to find point P7. Thereafter, P7 can be projected to P9 bringing all three constraints into closer conformity. These steps are repeated, adjusting for one constraint and then another, such that over several iterations the best fit of a point for all the constraints are found.

In block A70 the center point P11 between the tentative left and right edge points P9, P10 is calculated as one-half of the arc distance between the two edge points. This point P11 is then defined as the new center point of the tape path iteration. If necessary, points P9 and P10 are adjusted to points P9', P10' to insure that they are one-half a tape width in surface distance from the new center point P11 so that the edges lie within a real distance of where the tape edge will be laid. In blocks A76 and A79, vectors V9 and V10 are calculated as actual directional vectors along the surface from the previous left edge point P1 to the new edge point P9' and from the previous right edge point P2 to the new right edge point P10'.

At this time a subroutine labeled BORDER is called to determine if any or all of the tape paths have intersected the ply periphery during the iteration step. On the first call to subroutine BORDER, a subroutine labeled EXTRPT is called three times, one for each tape path, to examine the present point to decide if it is outside the ply periphery. If so, a corresponding flag or switch defining either the left, right, or center path is set. The subroutine BORDER uses the information found by the subroutine QWKEDJ to check for the periphery segment intersection. Only the segments which were marked as possibly being intersected by a particular path are tested. The subroutine BORDER will call another subroutine labeled INTSCT to perform the intersection of the directed vector between the last two points along a tape path with each ply periphery segment that was marked previously. The subroutine INTSCT sets one of the flag values to a one and the intersection points in an array labeled INTPT when the path has been intersected in the last delta vector step upon a return from the subroutine BORDER. The routine PATHCK will examine the flags in blocks A80, A82, and A84 to determine whether the path iteration in the +ply angle direction should stop. On encountering any other value than all of the tape paths intersecting the periphery, the previous points P0, P1, and P2 will be overlaid FIG. 12 with the now calculated new points P11', P9', and P10', respectively. The vector directions of the tape along the paths V1 and V2 are replaced by the new calculated directional vectors V9 and V10, respectively, before the program loops back to the address NEXT POINTS. This process of computing new edge path points and then a new center point will be repeated until all the paths including the left, right, and center paths cross the ply periphery.

At that time, the first half of the course data is stored in block A92 and the initial left and right tape edge path points are interchanged as indicated in block A98. The path direction vector V0 is negated indicating a negative ply angle in block A100. This operation negates the ply angle vector and allows the process to begin once more but in the −ply angle direction. The −ply angle algorithm provides an incremental calculation for the center, left, and right tape paths, as the +ply angle algorithm did by transferring control to the address LOOP of the program. Thus, the process is identical to that of the iterations in the +ply angle direction except that is in the other direction. When the subroutine BORDER indicates in blocks A80, A82, and A84 that the ply periphery segments in the −ply angle direction have been intersected, the program falls through to the block A86 where the path iteration variable indicates that both segments of the natural path have been calculated.

Thereafter, the program continues at the address FORM FILE at block A102. This operation will cause the subroutine REORDR to be called to add the terminal ply periphery intersection points to the tape path arrays. These points are inserted in the tape path arrays at the appropriate subscript positions to define the tape cuts necessary to form the article. The subroutine INVERT is then called to invert the arrays for the −ply angle direction. In combination with this routine a subroutine labeled FLPFLP is called to interchange the left and right edge data defined while iterating in the −ply direction. The tape path points are then stacked in the plus ply angle direction in arrays into a continuous order from the minus to the plus angle direction. The subroutine REORDR will then call the subroutine REDUND to delete any identical, or nearly identical, points from the end of the tape path arrays as indicated by block A104. The well ordered, nonredundant tape path data is then copied into final left, right, and center tape paths arrays. Another subroutine labeled DUPPTS will scan the tape paths arrays to eliminate any duplicate points as indicated in block A106 and will also define the total number of path points as indicated in block A106.

The subroutine PATHCK will then call another routine labeled PTHINT to determine intersections that each of the tape path arrays make with the ply periphery. Those intersections will be recorded in appropriate arrays for the left intersection points, right intersection points, and the center intersection points. The number of the intersections will be checked with the ply periphery arrays such that the program determines if each tape course makes an even number of intersections with the periphery. After control is returned to the PATHCK subroutine from this operation, calculation of the course path will halt and control will be returned to the calling source.

While a preferred embodiment of the invention has been illustrated, it will be obvious to those skilled in the art that various modifications and changes may be made thereto without departing from the spirit and scope of the invention as defined in the appended claims.

What is claimed is:

1. A multi-axis tape laying machine for depositing composite tape in selected generally parallel courses upon a mandrel having a complex contoured surface to form thereon a conforming ply and for laying succeeding plies in like manner upon said first-mentioned ply to build a laminated structure upon said mandrel, said tape laying machine comprising:
   a tape laying head movable in a plurality of axes under controlled power applied in accordance with control signals;
   a control processor for receiving machine instructions and for generating said control signals in accordance with said machine instructions; and
   means for generating said machine instructions defining the natural path of each selected tape course on the surface of said mandrel from a representation of said surface, an incremental step distance of movement along said natural path, and the width of said tape.

2. A multi-axis tape laying machine as defined in claim 1 wherein said means for generating machine instructions includes:
   means for describing a tape course of a ply in terms of geometric data defining motions of said tape head in space, and
   means for interpreting said geometric data and for translating said geometric data into said machine instructions to cause said tape head to follow said described motions.

3. A multi-axis tape laying machine as defined in claim 2 wherein:
   said geometric data defines motions for laying said tpae courses along their natural paths on said complex contoured surface.

4. A multi-axis tape laying machine as defined in claim 2 wherein said means for describing a tape course includes:
   means for generating sequential sets of course points which are included in said representation of said surface and which define the natural path of said composite tape over the surface.

5. A multi-axis tape laying machine as defined in claim 4 wherein said means for generating sequential sets of course points includes:
   means for generating said sets of course points said incremental step distance away from each other set, and perpendicular to a line connecting the previous set of points in the sequence.

6. A multi-axis tape laying machine as defined in claim 4 wherein said means for generating sequential sets of course points includes:
   first means for calculating tentative next points which are said incremental step distance away from said last course points in a last tape path direction.

7. A multi-axis tape laying machine as defined in claim 6 wherein said means for generating sequential sets of course points includes:
   a second means for calculating a set of projected points by projecting said tentative next points onto the representative surface and for replacing said tentative next points with said projected points.

8. A multi-axis tape laying machine as defined in claim 7 wherein said means for generating sequential sets of course points includes:
   third means for calculatiang a tape course direction between said last course points and said tentative next course points, and for replacing said last tape path direction with said calculated tape course direction.

9. A multi-axis tape laying machine as defined in claim 8 wherein said means for generating sequential sets of course points includes:
   fourth means for calculating an untensioned tape course direction as perpendicular to a line connecting the last tape course points and in the plane formed by said line and said last tape path direction, and for replacing said last tape course direction with said untensioned tape course direction.

10. A multi-axis tape laying machine as defined in claim 9 wherein said means for generating sequential sets of course points includes:
    means for generating the next set of points of the sequence by utilizing said first, second, third, and fourth calculating means to adjust the position of said last set of course points and the direction of said last tape course direction.

11. A multi-axis tape laying machine as defined in claim 10 wherein said means for generating sequential sets of course points includes:

said means for generating said next set of points positions the next set said incremental step distance away from said last set of course points, perpendicular to a line connecting said last course points, and as included in said representative surface.

12. A multi-axis tape laying machine as defined in claim 11 wherein said means for generating sequential sets of course points includes:

said means for generating said next set of points adjusts the last course direction to the direction between the last set of course points and the next set of course points.

13. A multi-axis tape laying machine as defined in claim 1 wherein said means for generating machine instructions include:

means for describing a plurality of tape courses forming a present ply; and means for describing a plurality of tape courses forming a next ply by substituting a representation of the surface formed by said present ply for the representation of the surface on which said present ply is based.

14. A multi-axis tape laying machine as defined in claim 13 wherein:

the representation of the surface on which said present ply is based is the surface of said mandrel.

15. A multi-axis tape laying machine as defined in claim 13 wherein:

the representation of the surface on which said present ply is based is the surface of another ply in said laminated structure.

16. A multi-axis tape laying machine as defined in claim 1 wherein said means for generating machine instructions further include:

means for describing a plurality of tape courses forming a ply; and means for determining the amount of overlap or gap between adjacent tape courses in said ply.

17. A multi-axis tape laying machine as defined in claim 16 wherein said determining means further include:

means for alerting an operator if the overlap or gap between adjacent tape courses exceeds a predetermined value.

18. A multi-axis tape laying machine as defined in claim 17 wherein said determining means further include:

means for adjusting said tape courses of a ply to provide control over the gap or overlap between courses.

19. A multi-axis tape laying machine as defined in claim 2 wherein:

said geometric data defines a tape course path as a series of points along the longitudinal center line of the tape.

20. A multi-axis tape laying machine as defined in claim 19 wherein said means for generating machine instructions further include:

means for eliminating at least one of the center points from said geometric data if the difference in position between said at least one center point and the next center point in The series is not greater than a predetermined value.

21. A method for depositing an unstretchable composite tape in its natural path along a selected tape course upon complex contoured surface by means of a controllable tape laying head, said method comprising the steps of:

generating natural path data for a selected tape course in terms of the geometric motions of a tape being laid in said natural path, said data being derived from an incremental step along said natural path, the width of said composite tape, and a mathematical representation of the variations in said contoured surface;

interpreting said natural path data and generating machine instructions therefrom to control said tape laying head to perform said geometric motions;

transmitting said machine instructions to a tape head controller as the desired positions of the tape laying head; and executing said machine instructions with said tape head controller to move the tape laying head from position to position to lay the selected tape course along said natural path.

22. A method as set forth in Claim 21 wherein said step of generating natural path data includes the steps of:

providing an array of points representing the surface variations in said contoured surface;

selecting a present center point for the natural tape path which is located on the representative surface;

selecting an initial directional vector for the natural tape path;

selecting a present right edge point and left edge point located on the representative surface, each edge point being located one-half the width of the composite tape away from said present center point as measured along said representative surface, and each edge point located in a direction from said present center point perpendicular to said initial directional vector;

calculating present left course path and right course path vectors as parallel to said initial directional vector;

selecting a tentative next right edge point and a tentative next left edge point; said tentative edge points being one incremental step from said present edge points in the direction of said present course path vectors;

projecting said tentative edge points onto the representative surface to provide next left and right edge points;

calculating a next left course path vector between said present left edge point and said next left edge point;

calculating a next right course path vector between said present right edge point and said next right edge point;

calculating a next center point located at one-half the surface distance between said next left and next right edge points;

storing said next left, right, and center points as natural path data;

replacing said present left, right, and center points with said next left, right, and center points;

replacing said present course path vectors with said next course path vectors; and repeating the steps of the method from the step of selecting tentative edge points until the end of the tape course path.

23. A method as set forth in claim 22 which further includes the steps of:

defining a control plane with respect to said representative surface;

defining a closed periphery in said control plane comprised of at least three straight line segments;

projecting said closed periphery onto said representative surface to form a boundry for terminating said tape course;

initiating the generation of said natural path data for a course at said boundry; and terminating the generation of said natural path data for a course at said boundry.

24. A method as set forth in claim 22 wherein multiple courses of said composite tape are to be laid in a ply on said contoured surface, which further includes the steps of:

defining a control plane with respect to said representative surface;

defining a closed periphery in said control plane comprised of at least three straight line segments;

defining at least one control line in said control plane which intersects said closed periphery and along which the gaps between said multiple tape courses are to be closely controlled;

projecting said closed periphery onto said representative surface to form a boundry for terminating said tape courses;

projecting said at least one control line onto said representative surface;

initiating the generation of said natural path data for a course at said control line in one direction toward said boundry;

terminating the generation of said natural path data for a course at said boundry;

initiating the generation of said natural path data for a course at said control line in a direction opposite said one direction and toward said boundry; and repeating the steps of the method from the step of initiating natural path data in one direction until natural path data for enough tape courses to fill a ply bounded by said projected closed periphery are generated.

25. A method as set forth in claim 24 which further includes the steps of:

selecting the initial center points for adjacent tape courses of said ply on said control line and separating said selected points a predetermined distance based upon the width of the composite tape.

26. A method as set forth in claim 25 which further includes the step of:

rearranging the natural path data such that the geometric motion of a tape course is defined from one peripheral segment of said boundry across the contoured surface to another peripheral segment.

27. A method as set forth in claim 26 wherein said step of rearranging further includes:

rearranging the natural path data such that the geometric motions for laying adjacent tape courses are in generally opposite directions.

28. A method as set forth in claim 21 wherein said step of executing said machine instructions include the steps of:

controlling the movement of the tape laying head with a control signal generated from a closed loop control which attempts to null the difference between a desired position of the tape laying head and the actual position of the tape laying head with respect to said contoured surface; and controlling the periodic rate of transmitting said machine instructions to regulate the rate of change of the desired position of the tape laying head.

29. A method as set forth in claim 28 which further includes the steps of:

measuring feedback parameters indicative of the actual position of the tape laying head with respect to said contoured surface; and controlling said movement with said measured feedback parameters.

30. The method as set forth in claim 21 wherein said step of generating natural path data includes:

a. generating natural path data for a plurality of generally parallel tape courses forming a present ply of a multiple ply laminate;

b. substituting a representation of the surface formed by said present ply for the representation of the surface on which said present ply is based; and c. generating natural path data for a plurality of tape courses forming a next ply based upon said substituted representation of the present ply surface.

31. The method as set forth in claim 30 which further includes the steps of:

d. storing said present ply data;

e. replacing said present ply data with said next ply data;

f. repeating said steps (b) and (c)

g. repeating steps (d), (e), (f), and (g) until all plies of said multiple ply laminate have been stored.

32. The method as set forth in claim 30 wherein the step of substituting includes:

substituting a representation of the surface formed by said present ply for a representation of the complex contoured surface.

33. The method as set forth in claim 30 wherein the step of substituting includes:

substituting a representation of the surface formed by said present ply for a representation of the surface upon which said present ply is laid.

34. A multi-axis tape laying machine for depositing composite tape in selected generally parallel courses upon a mandrel having a complex contoured surface to form a conforming ply thereon; and for laying succeeding plies in a like manner upon said first-mentioned ply to build a laminated structure upon said mandrel, said tape laying machine comprising:

a tape laying head moveable in a plurality of axes under controlled power applied in accordance with control signals;

means for generating said control signals by executing a part program defining the course path for each tape course for each ply; and means for calculating each course path from a representation of said complex surface and an indication of course path orientation on the surface such that each course path conforms to the variations of said complex contoured surface, said course path orientation being defined with respect to a reference point and said course path calculation being initiated at said reference point so that the orientation of each course at the reference point will be the reference orientation.

35. A multi-axis tape laying machine as set forth in claim 34 wherein said means for calculating each course path further include:

means for defining a control plane relative to said surface representation including a closed boundary within said control plane which can be projected on said surface representation to define the outermost extent of each tape course of a ply; and said calculation of each course path extends along the surface representation until the projection of the boundary on the surface representation is intercepted.

36. A multi-axis tape laying machine for depositing composite tape as set forth in claim 34 wherein said means for generating each course path further includes:

means for calculating each course path as a series of points defining the longitudinal center line of said composite tape.

37. A multi-axis tape laying machine for depositing composite tape as set forth in claim 36 wherein said means for calculating each course path further includes:

means for reordering said series of points for each course such that the actual laying of each tape course initiates at said boundary of said laminated structure.

38. A multi-axis tape laying machine for depositing composite tape as set forth in claim 37 wherein said means for reordering includes:

means for reordering said series of points for each course such that the lay of each tape course is in the direction opposite that of the next adjacent course.

39. A multi-axis tape laying machine for depositing composite tape as set forth in claim 36 wherein said means for calculating each course path further includes:

means for determining the locations of one point in said series of points and the next two points in said series of points and for eliminating said next point from said series if it does not depart from a straight line between said one point and last point by more than a predetermined amount.

40. A multi-axis tape laying machine for depositing composite tape in selected generally parallel courses upon a mandrel having a complex contoured surface to form a conforming ply thereon, and for laying succeeding plies in a like manner upon said first mentioned ply to build a laminated structure upon said mandrel, said tape laying machine comprising:

a tape laying head moveable in a plurality of axes under controlled power applied in accordance with control signals;

means for generating said control signals by executing a part program defining the course path for each tape course of each ply;

means for calculating each course path from a representation of said complex surface and an indication of course path orientation such that each course path conforms to the variations of the complex surface, wherein said course path is generated as non-machine specific geometric data defining the tape laying head motions in space necessary to lay said course; and means for interpreting said geometric data of each course path and for translating said geometric data into said control signals which are specific to said tape laying head.

41. A multi-axis tape laying machine for depositing composite tape as defined in claim 40, wherein said tape laying head has variably directable cutter means responsive to a predefined set of said control signals for severing said composite tape, said means for interpreting further including:

means for interpreting geometric data of each course path defined its end geometry and for translating said end geometry into said predefined set of cutter control signals in order to sever said composite tape in said end geometry.

42. A multi-axis tape laying machine for depositing composite tape in selected generally parallel courses upon a mandrel having a complex contoured surface to form a conforming ply thereon; and for laying succeeding plies in a like manner upon said first-mentioned ply to build a laminated structure upon said mandrel, said tape laying machine comprising:

a tape laying head moveable in a plurality of axes under controlled power applied in accordance with control signals;

means for generating said control signals by executing a part program defining the course path for each tape course for each ply;

means for calculating each course path from a representation of said complex surface and an indication of course path orientation on the surface such that each course path conforms to the variations of said complex contoured surface;

means for displaying the plurality of tape courses forming each ply; and means for determining the amount of overlap or gap between adjacent tape courses in each ply.

43. A multi-axis tape laying machine as defined in claim 42 wherein said determining means further include:

means for altering an operator if the overlap or gap between adjacent tape courses exceeds a predetermined value.

44. A multi-axis tape laying machine as defined in claim 42 wherein said determining means further include:

means for adjusting said tape courses of a ply to provide control over the gap or overlap between courses.

* * * * *

UNITED STATES PATENT AND TRADEMARK OFFICE
CERTIFICATE OF CORRECTION

PATENT NO. : 4,696,707

DATED : September 29, 1987

INVENTOR(S) : Lewis, et al.

It is certified that error appears in the above-identified patent and that said Letters Patent is hereby corrected as shown below:

In the Abstract, Line 11, after "into" delete "a".

In the Abstract, Line 17, change "a" to --an--.

Column 4, Line 63, change "roller" to --rollers--.

Column 5, Line 44, change "roller" to --rollers--.

Column 6, Line 45, after "can" delete "be".

Column 6, Line 46, after "produced" insert --.-- (period).

Column 6, Line 48, after "control" insert --,-- (comma).

Column 6, Line 53, change "a" to --an--.

Column 7, Line 14, change "a", first occurrence, to -- an --.

Column 8, Line 8, change "an" to --a--.

Column 8, Line 54, change "134" to --131--.

Column 8, Line 57, change "134" to --131--.

Column 9, Line 15, change "extention" to --extension--.

Column 9, Line 54, after "of" delete --the--.

Column 9, Line 68, change "a" to --an--.

Column 10, Line 38, change "FIG." to --FIGS.--.

Column 12, Line 25, change "vectors" to --vector--.

Column 12, Line 56, change "211" to --221--.

Column 12, Line 56, change "233" to --223--.

Column 12, Line 58, change "211" to --221--.

Column 12, Line 59, change "a" to --an--.

UNITED STATES PATENT AND TRADEMARK OFFICE
CERTIFICATE OF CORRECTION

PATENT NO. : 4,696,707

DATED : September 29, 1987

INVENTOR(S) : Lewis, et al.

Page 2 of 2

It is certified that error appears in the above-identified patent and that said Letters Patent is hereby corrected as shown below:

Column 13, Line 39, change "1/2" to --one-half--.

Column 13, Line 49, change "ply" to --+ply--.

Column 14, Line 38, change "block" to --blocks--.

Column 15, Line 44, change "A36" to --A44--.

Column 15, Line 44, change "56" to --A56--.

Column 16, Line 67, after "that" insert --it--.

Column 17, Line 18, change "plus ply" to --+ply--.

Column 18, Line 14, change "tpae" to --tape--.

Column 18, Line 40, first occurrence, delete "a".

Column 19, Line 65, change "The" to --the--.

Column 20, Line 1, after "upon" insert --a--.

Column 24, Line 14, change "defined" to --defining--.

Column 24, Line 44, change "alterting" to --alerting--.

Signed and Sealed this

Fifteenth Day of March, 1988

Attest:

*Attesting Officer*

DONALD J. QUIGG

*Commissioner of Patents and Trademarks*